Sept. 19, 1961    J. A. RIDGWAY, JR., ET AL    3,000,809
AVOIDING HEAT-FRONT DAMAGE IN PLATINUM CATALYST REFORMING
Filed Dec. 1, 1958
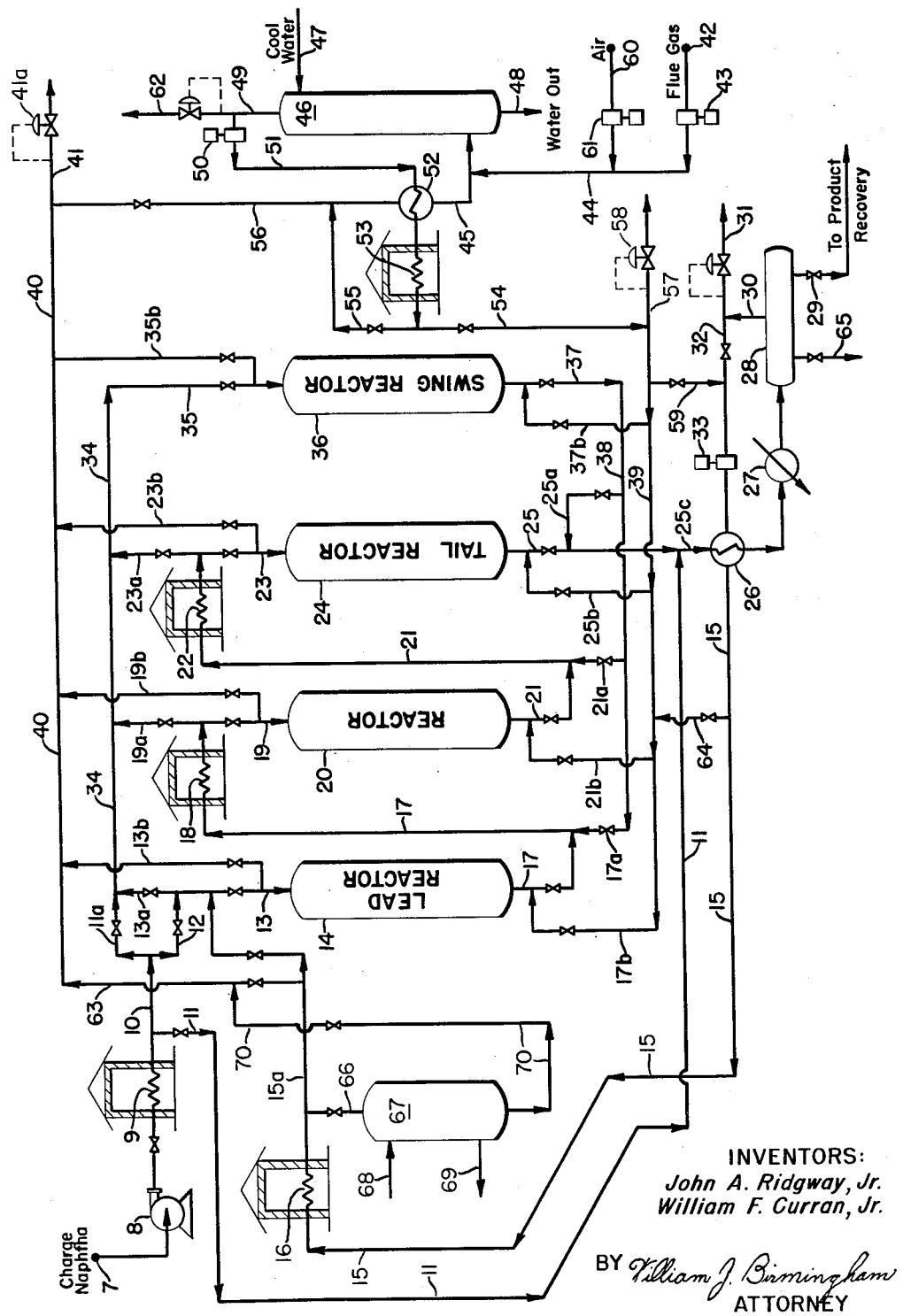
INVENTORS:
John A. Ridgway, Jr.
William F. Curran, Jr.
BY *William J. Birmingham*
ATTORNEY

United States Patent Office 3,000,809
Patented Sept. 19, 1961

3,000,809
AVOIDING HEAT-FRONT DAMAGE IN PLATINUM CATALYST REFORMING
John A. Ridgway, Jr., Texas City, and William F. Curran, Jr., Galveston, Tex., assignors, by mesne assignments, to Standard Oil Company, Chicago, Ill., a corporation of Indiana
Filed Dec. 1, 1958, Ser. No. 777,439
12 Claims. (Cl. 208—65)

This invention relates to naphtha reforming with platinum catalyst, and it pertains more particularly to a method for avoiding the deleterious effects of heat-fronts in beds of platinum catalyst which are being brought on-stream at reforming temperatures.

Platinum catalyst hydroforming systems present problems very different from those encountered in molybdenum systems. One particularly-difficult problem has been the unexpected formation of heat-fronts or hot spots which pass through a catalyst bed when new or freshly-regenerated platinum catalyst initially comes in contact with both hydrogen and hydrocarbons at reforming temperatures, e.g., 800° F. to 1000° F. This situation arises, for instance, when returning a bed of regenerated platinum catalyst to on-stream operation in a multiple fixed-bed system, as exemplified by Ultraforming (Petroleum Engineer, vol. XXVI, No. 4, April 1954, at page C-35) and Powerforming (The Oil and Gas Journal, vol. 54, No. 46, March 19, 1956, at page 150).

Such systems include lead, intermediate and tail reactors, heating zones, a gas separation zone, and compressor and lines for recycling hydrogen-rich separated gas. When catalyst in a particular reactor becomes substantially deactivated, that reactor is isolated and the catalyst regenerated while reforming continues in the remaining reactors. In such systems hydrogen-rich recycle gas and naphtha are already at reforming temperature when coming into contact with the regenerated catalyst. Two distinct heat-fronts may result. The first heat-front usually begins when hydrogen-rich recycle gas initially contacts the catalyst. The second heat-front appears when naphtha is subsequently introduced into the reactor. The resulting heat-fronts cause coke formation on the catalyst with consequent catalyst deactivation. In extreme cases, heat-fronts may also cause permanent deactivation by changing the crystalline structure of the catalyst, e.g., from active gamma, chi, or eta alumina to inactive alpha alumina, particularly in the case of platinum-alumina catalysts containing halogen.

It is therefore an object of this invention to avoid heat-front damage to platinum catalyst when a reactor is being returned to reforming operation at reforming temperatures. Another object of this invention is to permit the return to on-stream operation of a reactor containing regenerated platinum catalyst without having to cool the catalyst bed or lower the temperature of the hydrogen-rich recycle gas and naphtha introduced therein below conventional reforming temperatures. These and other objects will be apparent as the detailed description of the invention proceeds.

To avoid heat-front damage when bringing a reaction zone containing a highly-active platinum catalyst on-stream at reforming temperature, the reaction zone is purged with flue gas at about 700 to 1000° F. to remove oxygen therefrom, and then the flue gas is displaced with hydrocracking-resistant gas, following which naphtha vapors are introduced. The hydrocracking-resistant gas is prepared by sending at least a portion of hydrogen-rich separated gas (i.e., recycle gas, which normally includes hydrocarbons having more than one carbon atom per molecule) to a special cracking zone wherein it is contacted with a cracking catalyst and under conditions effective for cracking hydrocarbons in the separated gas. The resulting contacted gas contains substantially no hydrocarbons having more than one carbon atom per molecule. When the resulting hydrocracking-resistant gas, rather than hydrogen-rich separated gas, is employed for purging, no hot spots are incurred prior to introducing naphtha vapors into the reaction zone. This permits extended purging and/or pressuring-up periods, if desired, for removal of contaminants, e.g., water, and the like, without risking deleterious hot spots. The deleterious effect of any hot spot which may subsequently occur upon the introduction of naphtha into the reaction zone can then be readily minimized by introducing naphtha at full flow rates immediately. The resulting rapid flow of hydrocarbons is thus able to carry away heat generated by hot spots so that catalyst temperatures do not rise to damaging levels.

To hydrocrack hydrocarbons in hydrogen-rich separated gas to methane in the cracking zone, cracking catalyst and conditions well known in the art may be employed, the particular catalyst and conditions per se not constituting the present invention. Examples of a cracking catalyst are supported nickel catalyst, e.g., nickel-on-kieselguhr, nickel-on-alumina, and the like; substantially-sulfur-free platinum-alumina catalysts, preferably containing halogen, and the like. A 10 to 90 percent (by weight) nickel-on-kieselguhr catalyst is preferred, e.g., Harshaw nickel catalyst N1–0104. When employing platinum catalysts, an alumina-supported catalyst containing 0.05 to 2.0 percent platinum and 0.2 to 5.0 percent halogen, e.g., fluorine and/or chlorine, is preferred. The platinum catalyst should contain less than about 0.05 percent sulfur, which has a tendency to suppress the hydrocracking reaction.

The specific cracking conditions employed in the cracking zone depend in part on the particular catalyst employed. Typically, cracking conditions include a temperature in the range of about 500 to 1300° F., a pressure of atmospheric to 800 p.s.i. (with lower pressures usually preferred), and a volumetric space velocity of about 10 to 10,000 standard cubic feet of separated gas per hour per pound of catalyst. The separated gas normally contains about 60 to 90 mole percent of hydrogen.

Catalyst in the cracking zone may have any shape, e.g., pills, pellets, rings, rosettes, and the like. In a particular embodiment, the catalyst may be finely divided and thus capable of fluidization, e.g., particle sizes below about 200 microns, preferably 20 to 80 microns. In another embodiment the heat of the hydrocracking reaction which takes place in the cracking zone is carried away by suitable heat exchange. For such purpose a reaction zone of simple construction can be used, heat being removed by coils immersed in the fixed or fluidized bed, by heat-transfer at the walls, or the like. In a preferred embodiment the cracking zone may comprise a tube-and-shell-type reaction zone with a suitable fluid medium, e.g., steam, liquid sodium, Dowtherm (eutectic mixture of diphenyl and diphenyl oxide), or the like in either the tube or shell side, preferably the tube side. Other suitable reaction zones which include means for heat exchange are well known in the art. When employing such heat-exchange embodiments, the cracking catalyst is preferably fluidized for efficient heat exchange.

The cracking catalyst may optionally be periodically regenerated, the regeneration technique depending on the particular catalyst. In the case of platinum catalyst this is conveniently done by means of exposing the catalyst to oxygen (e.g., 1 mol percent oxygen in flue gas or nitrogen) at temperature above 700° F., whereby carbonaceous deposits are removed, and optionally exposing the catalyst to a halogen, e.g., chlorine, fluorine, in the presence or absence of oxygen at elevated temperatures, e.g., above 300° F. The carbon burnoff and exposure to halogen may readily be carried out in one step. Reactivation may be advantageously carried out between the periods when reaction zones are being returned to on-stream operation.

In a particularly advantageous embodiment of the present invention the hydrocracking-resistant gas, produced as above described, is employed in connection with a so-called hot-spot-quench technique. To bring a reaction zone on-stream in accordance with this embodiment, oxygen-containing gases are purged therefrom with flue gas at a temperature of about 700 to 1000° F. When oxygen has been eliminated and temperature of the catalyst bed has been adjusted to about reforming temperature, the reaction zone is purged at about atmospheric pressure with hydrogen-rich recycle gas for a period in excess of about 1 minute at a gas flow rate of about 1 to 25 standard cubic feet per hour per pound of platinum catalyst, preferably about 4 to 20 standard cubic feet per hour per pound of catalyst. This purge initiates the formation of a hot spot. The hydrogen-rich recycle gas is then purged with the hydrocracking-resistant gas prepared from recycle gas as above described, thereby quenching the hot spot, following which the reactor is pressured-up to about reforming pressure with either hydrocracking-resistant gas or recycle gas, and naphtha is introduced. Introduction of the special quench step, as above described, substantially eliminates both recycle gas and on-oil hot spots before any significant catalyst deactivation occurs.

With platinum-alumina catalyst beds of substantial depth, e.g., about 6 inches or more, the quench step may be repeated once or more times. In this embodiment, the hydrogen-rich recycle gas is again introduced prior to pressuring up and again passed through the bed for a period in excess of about 1 minute at a gas flow rate of about 1 to 25, preferably about 4 to 20, standard cubic feet per hour per pound of catalyst. Thereafter, the reactor is again purged with the hydrocracking-resistant quench gas. At such time as no significant heat fronts or hot-spots occur, e.g., no heat-front temperatures in excess of about 950 to 1000° F., after introducing hydrogen-rich recycle gas, the reactor may be safely brought on-stream by pressuring up and introducing naphtha, preferably (but, in this embodiment, not necessarily) as rapidly as possible.

Purging with hydrogen-rich recycle gas prior to quenching may be carried out for a period in excess of about one minute, i.e., about 1 minute to 1 hour, preferably about 3 to 30 minutes, optimally about 5 to 15 minutes. Such period is normally adequate for initiating potential hot spots or heat fronts, which may then be quenched before temperatures reach damaging levels. The presence of substantial hot-spots or heat-fronts is conveniently detected by means of thermocouples in the catalyst bed and/or by changes in recycle gas composition, e.g., an increase in methane and decrease in hydrogen.

For the quench step the catalyst should be treated with sufficient hydrocracking-resistant gas, at a minimum, to displace all of the hydrogen-rich recycle gas. The hydrogen-rich recycle gas, of course, contains substantial hydrocarbons capable of hydrocracking at reforming conditions. The quench step is preferably once-through to remove simultaneously any contaminants. Temperature of the quench gas should not exceed that of the heat front and preferably should be below that of the heat-front, so that some cooling of the heat-front may occur, e.g., to a temperature below about 900° F. Extreme temperature differentials should, however, be avoided to prevent thermal shock. Treating pressure is preferably atmospheric although higher or lower pressures may be used.

Following final treatment of the catalyst with quench gas, hydrogen-rich recycle gas may again be introduced for pressuring up to about reforming pressure. As an alternative to pressuring up with recycle gas, the hydrocracking-resistant quench gas may also be used for such purpose. As still another alternative, the reaction zone may be pressured up to an intermediate pressure with either the hydrocracking-resistant gas or recycle gas, preferably the former, and then pressuring up may be completed using the other. Temperature of the gas or gases introduced for pressuring up is normally about reforming temperature, e.g., 800 to 1000° F. Upon reaching reforming pressure naphtha vapors are introduced. With the regenerated reaction zone on-stream, another reaction zone may be removed, if desired, for regeneration.

If a hydrocracking-resistant gas is not used for purging as described hereinabove, heat-fronts may be formed and, when formed, usually pass through the catalyst bed at the rate of between 0.05 and 0.5 inch per second in the direction of recycle gas and/or naphtha flow. They may raise catalyst temperature to levels in excess of 1200 to 1300° F. The particular extent of coke formation resulting from heat-fronts depends on many variables, including the severity of the hot-spot, recycle gas rate, composition of the recycle gas, type of naphtha, initial activity of the catalyst, and the like. For instance, in one series of tests with a platinum-alumina catalyst containing 0.6 weight percent platinum and a Mid-Continent naphtha at a recycle gas rate of 4000 standard cubic feet per barrel, naphtha heat-fronts deposited coke on the catalyst to the extent of 0.02 weight percent coke for each 10° F. of temperature rise.

It has been observed that heat-fronts are usually encountered only for a short period after recycle gas and/or naphtha are introduced at reforming conditions. They are also usually encountered only with new platinum catalyst or used platinum catalyst which are in a highly active state. Heat-front formation may be particularly pronounced if the platinum catalyst contains appreciable amounts of halogen. When platinum catalyst reformers are started up from a relatively-cold condition, heat-fronts are usually not considered a problem because the platinum catalyst is normally contacted with hydrogen and hydrocarbons at temperatures substantially below reforming temperature, e.g., below about 800° F.

The invention will be more clearly understood by reference to the following example read in conjunction with the accompanying drawing which is a schematic flow diagram of an Ultraforming system in which the present procedure for bringing a reactor on-stream is advantageously applied.

In normal operation of an Ultraforming system a naphtha charge such as, for example, the 150 to 360° F. fraction of Mid-Continent virgin naphtha, which may or may not be hydrodesulfurized, is introduced from source 7 by pump 8 through preheater 9 and transfer line 10 from which the preheated charge may be by-passed by line 11 to the product recovery system during start-up procedure. In on-stream operation transfer line 10 will discharge through lines 12 and 13 to reactor 14 along with hydrogen-rich recycle gas from lines 15 and 15a which has been preheated in heater 16. Effluent from reactor 14 passes through line 17, reheater 18 and transfer line 19 to reactor 20. Effluent from reactor 20 passes through line 21, reheater 22 and transfer line 23 to tail reactor 24. It should be understood that more than three reheater-reactor stages may be employed in the system.

Effluent from the tail reactor flows through lines 25 and 25c, heat exchanger 26, and cooler 27 to separator 28 from which hydroformed product is withdrawn through line 29 to a stabilizer and/or conventional product recovery system. A part of the hydrogen-rich gas withdrawn from the separator through line 30 may be vented through line 31, but usually about 1,000 to 10,000 cubic feet per barrel of charge is recycled through line 32 by means of circulating compressor 33 to line 15.

Line 65 from separator 28 may be employed for drainage of water and/or other contaminants or off-specification product during start-up and the like.

Transfer lines 11a, 13a, 19a and 23a may be selectively connected to header 34 for discharging through line 35 to swing reactor 36, the effluent from which passes through line 37 to header 38 and thence through line 17a to line 17, line 21a to line 21, or line 25a to line 25. During normal on-stream operation without the swing reactor the valves in lines 11, 11a, 13a, 13b, 17a, 17b, 19a, 19b, 21a, 21b, 23a, 23b, 25a, and 25b remain closed and the valves in lines 12, 13, 17, 19, 21, 23 and 25 remain open.

The swing reactor may be substituted for the lead reactor by opening valves in lines 13a, 35, 37 and 17a and closing valves in lines 13 and 17. Alternatively, it may be substituted for intermediate reactor 20 by opening valves in lines 19a, 35, 37 and 21a and closing the valves in lines 19 and 21. The swing reactor may take the place of the tail reactor by opening valves in lines 23a, 35, 37 and 25a and closing valves in lines 23 and 25. It will thus be seen that each of the reactors may be taken off-stream for regeneration and replaced by the swing reactor and that, alternatively, the swing reactor may be connected to operate in parallel with any of the other on-stream reactors during periods when no regeneration is required.

Each of the reactors is provided with a refractory lining of low iron content, and metal surfaces may preferably be aluminized. They may each contain about the same amount of catalyst although, if desired, the subsequent reactors may contain somewhat more catalyst than the initial reactors. The catalyst may be of any known type of supported platinum catalyst, and the platinum is preferably supported on alumina, it may be prepared by compositing a platinum chloride with an alumina support as described, for example, in U.S. Patent 2,659,701, and it preferably contains about 0.1 to 0.6 weight percent of platinum.

The on-stream pressure is usually below about 400 pounds per square inch gage, e.g., in the range of 200 to 350 pounds per square inch gage. The inlet temperatures to each reactor are usually in the range of about 800 to 1000° F., e.g., about 920° F., and may be approximately the same for each reactor although it is sometimes desirable to employ somewhat lower inlet temperature to the initial reactor than to the remaining reactors. The overall weight space velocity may be in the range of about 0.5 to 5 pounds of naphtha per pound of catalyst per hour. There is, of course, a pressure drop in the system so that the lead reactor may operate at about 50 to 100 pounds per square inch higher pressure than the tail reactor.

Prior to regeneration hot hydrogen-rich gas for stripping hydrocarbons from catalyst in a blocked-out reactor may be introduced from line 15a by line 63 to manifold line 40 and thence through one of lines 13b, 19b, 23b, or 35b to the selected reactor. Also, if desired, hydrogen-rich gas may be introduced from line 15 to manifold line 39 by line 64 and thence through one of lines 17b, 21b, 25b, or 37b, to the selected reactor. The hydrocracking-resistant gas of the present invention is prepared by bleeding a portion of the recycle from line 15a via valved line 66 to cracking zone 67, which contains a fixed or fluidized bed of cracking catalyst, e.g., a 70 percent nickel-on-kieselguhr catalyst. The cracking zone is maintained at cracking conditions, e.g., a temperature of about 600 to 1000° F., a pressure of atmospheric or higher, and a volumetric space velocity of 500 to 5,000 standard cubic feet per hour per pound of cracking catalyst, whereby demethylation of molecules containing more than one carbon atom is effected. While lower pressures favor the desired cracking (demethylation) reaction, cracking zone 67 may be operated at the pressure of the available recycle gas. Thus, if pressuring up of the reforming reaction zone with hydrocracking-resistant gas is desired, substantial compression thereof is not required.

Cracking zone 67 may be a conventional cylindrical reactor and/or it may be designed to allow heat exchange so as to cool the catalyst if necessary or desired. Such heat-exchange is schematically suggested in the figure by lines 68 and 69 via which the cooling medium, e.g., Dowtherm, is introduced and removed respectively. The hydrocracking-resistant gas produced in cracking zone 67 is introduced via line 70 to line 63 and thence to manifold line 40 for introduction to the reaction zones during purging and pressuring up.

For effecting purging and/or regeneration of the catalyst in any bed, purge gases and/or regeneration gases may be introduced either through manifold line 39 and a selected one of lines 17b, 21b, 25b and 37b or through manifold line 40 and a selected one of lines 13b, 19b, 23b, or 35b. Such purge and regeneration gases may be selectively withdrawn through corresponding lines at the top or bottom of the reactor, as the case may be, to the appropriate manifold. Gases may be vented or flared from manifold line 39 via line 57, which is equipped with pressure-controlled valve 58. Correspondingly, gases may be vented or flared from manifold line 40 via line 41, which is equipped with pressure-controlled valve 41a.

Flue gas from source 42 may be introduced to the system by compressor 43 and passed by lines 44 and 45 through a drying chamber 46 which is preferably a scrubbing tower into which cool water is introduced through line 47 and from which water is withdrawn through line 48. The scrubbed flue gas withdrawn from the top of the tower through line 49 is passed by compressor 50 through line 51, heat exchanger 52, and heater 53 either to line 54 and manifold line 39 or to lines 55, 56 and manifold 40, when it is desired to introduce flue gas into the system for purging and/or regeneration. By closing the valve in line 54 and opening the valves in line 55 and the lower part of line 56, the flue gas may be recirculated through line 56, heat exchanger 52 and line 45 back to the scrubber. Air may be introduced from source 60 by compressor 61 for effecting regeneration and/or additional oxidative treatment of the catalyst. During regeneration excess flue gas may be vented from the system via line 62. Air and/or flue gas from manifold line 39 may be introduced to the inlet of circulating compressor 33 by line 59.

One unique characteristic of the Ultraforming process, in contrast with non-regenerative platinum reforming processes, is the fact that an Ultraformer can be started up without use of extraneous hydrogen. Such a startup procedure is described in co-pending application S. N. 502,604, filed April 20, 1955, now Patent No. 2,910,430.

The method of effecting catalyst regeneration will be described as applied to the swing reactor but it will be understood that the same procedure may be employed for any one of the other reactors when it is blocked out. When the charge inlet valve in line 35 is closed and while the valve in line 37 remains open, hot hydrogen-rich recycle gas is introduced from line 15a by line 63 to manifold line 40 and thence through line 35b to strip out any hydrocarbons that may remain in the reactor, this stripped material being discharged through lines 37, 38, 35a, and 25c. Next, the valve in lines 63 and 37 are closed and reactor 36 is depressured by opening the valve in line 37b and valve 58 in line 57. Next, the reactor is purged to eliminate hydrogen-rich gas therefrom either by introducing flue gas from line 55 via lines 56, 40, and 35b, the purge gases being vented through lines 37b, 39, and 57 and valve 58. After the flue gas purge, valve 58 in line 57 is closed and introduction of flue gas from source 42 is continued to pressure the reactor with flue gas to approximately the same pressure as that employed in on-stream processing, i.e., about 300 pounds per square inch gage. The temperature of the catalyst bed is adjusted to about 650 to 750° F. preparatory to initiating regeneration by circulating flue gas, under such pressure, upflow through the reactor by means of compressor 50. The circulating flue gas leaves and returns to swing reactor 36 via 35b, 40, 56, 52, 45, 46, 49, 50, 51, 52, 53, 54, 39, and 37b, the appropriate valves being open or closed as the case may be. Heat may be supplied to the circulating gas by heater 53, if necessary.

Next, controlled amounts of air are introduced from source 60 by compressor 61 into the circulating flue gas stream at a rate to effect combustion of carbonaceous deposits without exceeding a combustion zone temperature of about 1050° F. The hot flue gas leaving the reactor at about this temperature passes by lines 35b, 40 and 56 through heat exchanger 52 and thence through line 45 to scrubber 46 wherein the gas is scrubbed with cool water for condensing and eliminating most of the water formed by combustion of hydrocarbonaceous deposits. The net amount of flue gas production is vented from the system through line 62, the valve in which is set to maintain the desired back pressure of about 300 pounds per square inch gage. The cooled flue gas which is recirculated by compressor 50 may be further dried by passing through a desiccant bed (not shown) before it is returned through heat exchanger 52 to heater 53 which, during regeneration, maintains a transfer line temperature of approximately 700° F. After the carbon deposits are removed, the transfer line temperature of heater 53 is increased to about 950° in order to reheat the catalyst bed to that temperature.

After regeneration, the introduction of air is stopped; the flue gas is circulated to adjust catalyst bed temperature. Simultaneously, additional flue gas is introduced from source 42 to displace oxygen from the swing reactor and from the regeneration system. Part of the circulating gases is vented via line 57 at about the same rate as flue gas is added, thereby maintaining pressure substantially constant. After oxygen content is reduced below at least about 1 mol percent, the valves in lines 54 and 56 are closed and the introduction of flue gas is stopped. The swing reactor is then depressured by slowly opening the valve 58 in line 57. After depressuring, the valve in line 56 is again opened and swing reactor 36 is again purged at about atmospheric pressure with flue gas to remove all residual oxygen, after which valve in line 56 is again closed.

After removal of all oxygen, the system is purged, in accordance with the present invention, at about atmospheric pressure with hydrocracking-resistant gas prepared by passing a portion of the recycle gas from line 15a via line 66 to cracking zone 67, wherein ethane and higher hydrocarbons are cracked to methane. The hydrocracking-resistant gas is introduced to swing reactor 36 by opening the valve in line 70 and passing the gas via lines 70, 63, 40, and 35b. The purged gases leaving swing reactor 36 are preferably vented from the system via lines 37b, 39, and 57 and valve 58. The purge is continued until at least substantially all flue gas is removed from swing reactor 36, following which valve 58 is set to hold back at least reforming pressure and swing reactor 36 is pressured up to reforming pressure with hydrocracking-resistant gas. When the reactor is thus brought to desired operating pressure, the valves in lines 70, 35b and 37b are closed, and the reactor may be placed on-stream by opening valves in lines 35 and 37, preferably as rapidly as possible. Prior to introducing naphtha, swing reactor 36 may alternatively be subjected to prolonged purging with hydrocracking-resistant gas to as to remove contaminants, e.g., water from the catalyst and reactor internals. This purging also reduces the catalyst from higher oxide forms and the resulting water so formed is eliminated from the system prior to introducing naphtha.

Because the hydrogen-containing purge gas from cracking zone 67 is hydrocracking-resistant, no hot-spots are encountered upon introduction of the gas into swing reactor 36. When naphtha vapors are also introduced, any resulting hot spot is minimized by high-flow rates which carry away heat so generated before injurious temperature levels are reached. While in the figure hydrocracking-resistant gas is shown to be introduced by opening valves in lines 66 and 70, it should be understood (although not shown), that cracking zone 67 can be in continuous or semicontinuous operation even when no hydrocracking-resistant gas is required for purging. For example, recycle gas can be continuously bled from line 15a via line 66 to cracking zone 67. When hydrocracking-resistant gas is not required for purging, the gas from cracking zone 67 can be stored, vented, and/or returned to the recycle gas stream. Since cracking zone 67 need not be in continuous operation, ample time is usually available between purges for regeneration of the cracking catalyst.

When employing the present invention as part of the quench technique, hydrogen-rich recycle gas from line 15 (and 15a) is introduced through lines 63, 40 and 35b by opening the valve in line 63. The purge is continued for a period in excess of about 1 minute, e.g., about 5 minutes, at a gas flow rate of about 1 to 25, preferably about 4 to 20, standard cubic feet of gas per hour per pound of catalyst in swing reactor 36. The purge gases leave swing reactor 36 via lines 37b, 39, and 57 and are preferably vented. The valve in line 63 is then closed and the valves in lines 66 and 70 opened whereby hydrocracking-resistant gas from cracking zone 67 is introduced via lines 70, 40 and 35b to swing reactor 36, the displaced gases being vented from swing reactor 36 via lines 37b, 39, and 57. The introduction of hydrocracking-resistant gas is continued until, at least, all ethane and heavier hydrocarbons are removed from swing reactor 36. The purge with hydrocracking-resistant gas may preferably be continued for a longer period of time to remove deleterious substances from the catalyst, e.g., water.

After the purge with hydrocracking-resistant gas the gas is displaced with hydrogen-rich recycle gas introduced by closing valve in line 70 and opening valve in line 63. If further hot-spots are detected, e.g., by the thermocouples in the catalyst bed, the introduction of hydrocracking-resistant gas is repeated as hereinabove described. If no further heat-fronts or hot-spots are detected, valve 58 in line 57 is then set to hold back reforming pressure and the system is pressured up with either hydrogen-rich recycle gas or hydrocracking-resistant gas or both. When the reactor is thus brought to desired operating pressure and valves in lines 70, 63, 35b, and 37b are closed, the reactor may be placed on-stream by opening valves in lines 35 and 37.

Because of the carefully-controlled procedure for initially introducing hydro-rich recycle gas and the quench step, as hereinabove described, no damaging heat-fronts are encountered at any time when returning reactors, after reactivation, to on-stream operation at reforming temperatures. Without the present technique, temperatures would have to be lowered substantially below reforming temperatures to minimize the damage from the consequent heat-fronts. Lowering temperature, of course, involves additional expense and substantially prolongs the reactivation cycle.

While the invention has been described herein as applied to bringing the swing reactor of an Ultraforming unit on-stream while other reactors in the system are already on-stream, it should be understood that it is equally applicable to each of the other reactors when bringing said reactors on-stream. The invention has also been described as applied to a freshly-regenerated catalyst. It should be understood, of course, that it is also applicable to new platinum catalysts which are contacted simultaneously with hydrogen and hydrocarbons at reforming conditions. While the invention has been described as applied to a particular Ultraforming system, various alternative processing arrangements and operating

Having thus described the invention, what is claimed is:

1. In a platinum-catalyst naphtha reforming system including lead, intermediate, and tail reaction zones, a gas-separation zone, a compression zone for recycling hydrogen-rich separated gas, said separated gas containing hydrocarbons having more than one carbon atom per molecule, a method of bringing a reaction zone containing platinum catalyst on stream at reforming temperatures during operation of the reforming system which comprises purging said reaction zone with flue gas to remove oxygen therefrom; purging said reaction zone with a hydrocracking-resistant gas prepared by contacting in a separate cracking zone at least a portion of said separated gas at least intermittently with a cracking catalyst and under conditions effective for cracking hydrocarbons in said separated gas to methane, whereby the resulting contacted gas contains substantially no hydrocarbons having more than one carbon atom per molecule; pressuring up said reaction zone to about reforming pressure; and introducing naphtha vapors therein.

2. The method of claim 1 wherein said cracking catalyst is a supported-nickel catalyst.

3. The method of claim 1 wherein said cracking catalyst is a substantially-sulfur-free platinum-alumina catalyst.

4. The method of claim 3 wherein at least a portion of said substantially-sulfur-free platinum-alumina catalyst is at least periodically regenerated by contacting at elevated temperature with an oxygen-containing gas and with a halogen-containing gas.

5. The method of claim 1 wherein said cracking catalyst is a finely-divided cracking catalyst.

6. The method of claim 1 including the additional step of cooling said cracking catalyst by heat exchange.

7. The method of claim 1 wherein the step of pressuring up said reaction zone is carried out with said hydrocracking-resistant gas.

8. In the method of bringing a reaction zone containing platinum catalyst on stream at reforming temperatures during operation of the reforming system, which method comprises purging said reaction zone with flue gas to remove oxygen therefrom, purging said reactor with hydrogen-rich gas containing hydrocarbons having more than one carbon atom per molecule, purging said reactor with a hydro-cracking-resistant gas, again introducing said hydrogen-rich gas into said reaction zone, and introducing naphtha vapors therein, the improved method which comprises contacting at least intermittently at least a portion of said hydrogen-rich gas with a cracking catalyst and under conditions effective for cracking hydrocarbons whereby substantially completely all hydrocarbons containing more than one carbon atom per molecule are cracked to methane, and employing the resulting contacted gas as said hydrocracking-resistant gas.

9. The method of claim 8 wherein said cracking catalyst is a nickel-on-alumina catalyst.

10. The improved method of claim 8 wherein said cracking catalyst is a nickel-on-kieselguhr catalyst.

11. The method of claim 8 wherein said cracking catalyst is a finely-divided catalyst and including the additional step of cooling said cracking catalyst by heat exchanging with a fluid medium.

12. The method of claim 1 wherein is included the step of purging said reactor with hydrogen-rich gas containing hydrocarbons having more than one carbon atom per molecule to remove flue gas therefrom interposed between said flue gas purge and said hydrocracking-resistant gas purge.

References Cited in the file of this patent

UNITED STATES PATENTS

| | | |
|---|---|---|
| 2,547,221 | Layng | Apr. 3, 1951 |
| 2,707,675 | Pettyjohn et al. | May 3, 1955 |
| 2,758,064 | Haensel | Aug. 7, 1956 |
| 2,873,176 | Hengstebeck | Feb. 10, 1959 |
| 2,914,465 | Hengstebeck | Nov. 24, 1959 |
| 2,944,008 | Haxton et al. | July 5, 1960 |